(12) United States Patent
Meranda et al.

(10) Patent No.: US 10,223,906 B2
(45) Date of Patent: Mar. 5, 2019

(54) OPEN NEUTRAL DETECTION

(71) Applicant: Florida Power and Light Company, Juno Beach, FL (US)

(72) Inventors: Adam David Meranda, Juno Beach, FL (US); Jose Cardelle, Juno Beach, FL (US)

(73) Assignee: Florida Power & Light Company, Juno Beach, FL (US)

( * ) Notice: Subject to any disclaimer, the term of this patent is extended or adjusted under 35 U.S.C. 154(b) by 52 days.

(21) Appl. No.: 15/412,975

(22) Filed: Jan. 23, 2017

(65) Prior Publication Data

US 2018/0211518 A1   Jul. 26, 2018

(51) Int. Cl.
*G08C 19/12* (2006.01)
*G06Q 30/00* (2012.01)
*G06Q 50/06* (2012.01)

(52) U.S. Cl.
CPC .......... *G08C 19/12* (2013.01); *G06Q 30/016* (2013.01); *G06Q 50/06* (2013.01); *G08C 2200/00* (2013.01)

(58) Field of Classification Search
CPC ..................................................... G08C 19/12
See application file for complete search history.

(56) References Cited

U.S. PATENT DOCUMENTS

| 3,243,796 | A | 3/1966 | Harmon et al. |
| 3,891,894 | A | 6/1975 | Scarpino |
| 4,151,460 | A | 4/1979 | Seese et al. |
| 4,607,309 | A | 8/1986 | Bishop |
| 5,267,117 | A | 11/1993 | Moore |

(Continued)

FOREIGN PATENT DOCUMENTS

| CN | 102928729 | 2/2013 |
| CN | 202770949 | 3/2013 |

(Continued)

OTHER PUBLICATIONS

Li, D., et al., "Novel Detection Method of High Voltage Power Metering Circuit Fault based on Electric Energy Meter Phase and Voltage Transformer", International Journal of Control and Automation, Jul. 2016, pp. 319-330, vol. 9, No. 7.

(Continued)

*Primary Examiner* — Amine Benlagsir
(74) *Attorney, Agent, or Firm* — Jeffrey N. Giunta; Fleit Gibbons Gutman Bongini & Bianco P.L.

(57) ABSTRACT

Systems and methods to determine open neutral conditions in a poly-phase electrical connection. Voltage measurements of at least two phases of poly-phase electrical power delivered to a customer premises are received from an electrical meter via a communications network providing communications among many electrical meters. The electrical power is delivered with a neutral conductor separate from the at least two phases. A first voltage measurement of a first phase and a second voltage measurement of a second phase of at least two phases are received. Based on determining that a difference between the first voltage measurement and the second voltage measurement exceeds a phase-to-phase threshold amount, a likely open neutral condition in the neutral conductor is determined. An indication of the likely open neutral condition is sent to a customer service system.

23 Claims, 7 Drawing Sheets

(56) References Cited

U.S. PATENT DOCUMENTS

| | | | |
|---|---|---|---|
| 5,428,549 | A | 6/1995 | Chen |
| 7,057,401 | B2 | 6/2006 | Blades |
| 7,355,412 | B1 | 4/2008 | Cannon |
| 7,368,830 | B2 | 5/2008 | Cleveland et al. |
| 7,535,234 | B2 | 5/2009 | Mernyk et al. |
| 7,791,351 | B2 | 9/2010 | Raber |
| 8,076,923 | B2 | 12/2011 | Suozzo et al. |
| 8,131,485 | B2 | 3/2012 | Balcerek et al. |
| 8,861,155 | B2 | 10/2014 | Rostron |
| 8,862,435 | B2 | 10/2014 | Spanier et al. |
| 8,981,755 | B2 | 3/2015 | Beekmann et al. |
| 9,046,560 | B2 | 6/2015 | Li |
| 9,136,692 | B2 | 9/2015 | O'Regan et al. |
| 9,250,282 | B2 | 2/2016 | Ukil et al. |
| 2007/0183369 | A1* | 8/2007 | Angelis .................. G06Q 50/06 370/332 |
| 2007/0258175 | A1* | 11/2007 | Montgomery ......... H02H 5/105 361/42 |
| 2009/0284249 | A1 | 11/2009 | Syracuse et al. |
| 2014/0098450 | A1 | 4/2014 | Jecu et al. |
| 2015/0212139 | A1 | 7/2015 | Smith |
| 2016/0036214 | A1* | 2/2016 | Meiri ..................... H02H 7/263 361/86 |

FOREIGN PATENT DOCUMENTS

| | | |
|---|---|---|
| GB | 1140446 | 1/1969 |
| WO | 2007011196 | 1/2007 |
| WO | 2012171694 | 12/2012 |
| WO | 2014192021 | 12/2014 |
| WO | 2015179908 | 12/2015 |

OTHER PUBLICATIONS

Roland, U., et al., "Detection and Analysis of Faults in Power Distribution Network Using Artificial Neural Network", International Journal of Scientific & Engineering Research, Oct. 2014, pp. 955-960, vol. 5, Issue 10.

Anand, P., "Autonomous Troubleshooting Scheme for Power Quality Monitoring in Distribution Systems", International Journal of Electrical Engineering, 2014, pp. 391-398, vol. 7, No. 3.

Music, M., et al., "Integrated Power Quality Monitoring Systems in Smart Distribution Grids", Proceedings of Energy Conference and Exhibition (ENERGYCON), Sep. 9-12, 2012, pp. 1-6.

\* cited by examiner

OPEN NEUTRAL DETECTION

FIELD OF THE DISCLOSURE

The present disclosure generally relates to electrical power distribution to customers, and more particularly to monitoring line conditions to identify possible discontinuities in a power distribution line.

BACKGROUND

Poly-phase power connections include power connections having three or more phases and are known to those familiar with the art. Three-phase power connections between a utility and a customer premises often have a wye (or "Y") configuration in which three phases from a service transformer of the electric utility are connected to an electric meter at the customer premises along with a "neutral" return connection. When all of the three phases of the electrical load at the customer premises are balanced, the neutral connection does not normally carry electrical current. When an imbalance between the phases exists, some electrical current may be carried on the neutral line. A disconnection in the neutral line, such as would be caused by a broken wire or other discontinuity, is referred to herein as an open neutral condition. An open neutral condition may not be readily apparent because the neutral line may not carry an appreciable amount of electrical current under normal conditions even when the neutral line is properly connected. Open neutral conditions are able to lead to a number of various problems.

Open neutral conditions are presently identified based on customer reports with complaints of voltage fluctuations or other service irregularities. Once a customer reports a problem, service personnel are dispatched to the customer facility to investigate the problem. Dispatching service personnel only after receiving a customer report may delay repair of the open neutral conditions and may result in increased repair costs, damage to equipment, other problems, or combinations of these. In some instances, identification of the open neutral condition once service personnel visit the customer facility requires special monitoring equipment to be installed to monitor voltage conditions over a period of time, which can further increase costs and delay repairs.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
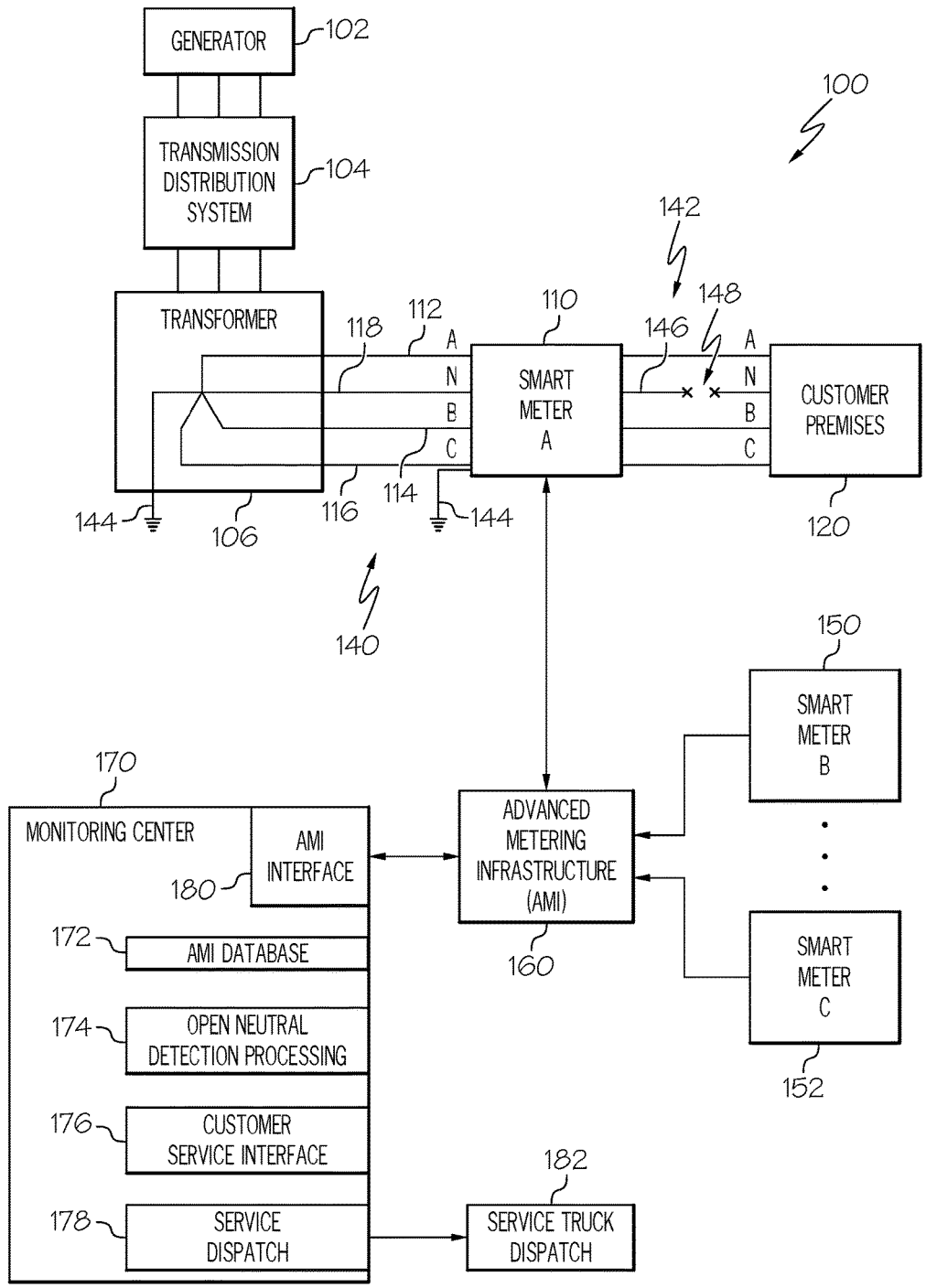
FIG. 1 illustrates an automated open neutral detection power distribution system, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods describe an automated process to identify likely open neutral conditions at a customer premises based on analysis of electrical measurements made by smart meters that are installed at the customer premises. In the following discussion, a likely open neutral condition is an example of a determined probability of any one of an open circuit, an intermittently open circuit, or an increasing impedance in a neutral conductor of poly-phase electrical power that is delivered with a neutral conductor. Initially an increased impedance open neutral may result in abnormal electrical behaviors at the premises that do not damage electrical devices at the premises and does not rise to the level of objectionable electrical service that would motivate a customer to call in a complaint about the service. Correction of open neutral conditions before a customer complaint is received and before damage to electrical devices at the premises increases customer satisfaction and reduces electrical service provider liability resulting from damaged electrical devices. The below described systems and methods determine a likely open neutral condition prior to physical investigation of the customer premises and, if appropriate, dispatching personnel to repair the condition thereby avoiding or minimizing any customer dissatisfaction due to the quality of electrical service provided, and avoiding or minimizing any damage to electrical equipment at the customer premises. This determination is made in an example by an automated process based on measurements reported by smart meters. In an example, these smart meters report those measurements by sending measurement data to a central repository over an Advanced Metering Infrastructure (AMI).

The below described systems and methods allow continual, automated monitoring for likely open neutral conditions of any customer facility that has a smart meter.

Identifying likely open neutral conditions through automated monitoring of smart meter data, which is continually collected and reported for many customer premises, allows quicker, more efficient and effective identification of likely open neutral conditions. By more quickly identifying such conditions, proactive actions can be taken to more quickly address possible problems and perform repairs before more serious damages occur. In various examples, once a likely open neutral condition is identified based on automated analysis of smart meter measurement data, the customer is able to be notified of a possible problem, service personnel are able to be dispatched to investigate the problem sooner after the time that the open neutral condition develops, other remedial actions are able to be more quickly performed, or combinations of these.

In some examples, an initial indication of an open neutral condition is able to be based on either observed voltage characteristics reported by smart meters at customer locations or based on customer reports of problems that might indicate an open neutral condition. In an example, commands to increase the measurement rate, reporting rate, or both, of smart meters associated with customer premises for which one or both of these initial indicators are received. Increased measurements occupy more communication capacity of the smart grid communication system (particularly in a mesh type communication network) than the smart meters use for communications of typical information. Selectively increasing the measurement and/or reporting rates of only meters involved in suspect conditions, as opposed to all meters on the smart grid, preserves the capacity of the smart grid for normal communications of the other smart meters of the smart grid thereby enhancing the performance of the smart grid under increased measurement sampling conditions. The below described systems and methods in an example are able to analyze the more frequently measured or reported data to more accurately or quickly confirm the presence of an open neutral condition. In some examples, analysis of the reported data is able to indicate that the problem is not an open neutral condition and may further identify other problems that may be the underlying cause of the customer report or measurement irregularities. In some examples, the analysis of the more frequently measured or reported data is able to support more accurately determining and identifying by automated means potential problems at a customer facility and allow proactive measures to be taken either automatically, manually, or both. For example, automated evaluations of continuously reported smart meter data can identify a need to dispatch service personnel allowing quicker repairs to be performed with potentially reduced costs and overall reductions in down time for customers.

To support more effectively and efficiently identifying open neutral conditions based on measurements reported by smart meters, the inventors have identified unique characteristics that are present in a three-phase, wye-connected electrical power interface that has an open neutral condition. In an example, it has been observed that a likely open neutral condition is able to be indicted by observing that a voltage difference between two phases of the three phases delivering power to a customer premises is greater than a phase-to-phase threshold. In an example, the phase-to-phase threshold is a function of the voltages reported as being present on the two phases for which the difference is determined. In an example, twenty percent (20%) of an average of the voltages measured and reported for these two phases is used as this phase-to-phase threshold. In an example, any two of the three phase power lines, other than the neutral line, of the wye-connected electrical power interface connection is able to be the two phases whose voltage difference is determined to exceed the phase-to-phase threshold. In an example, determining a likely open neutral condition need not be based on a voltage measurement of the remaining third phase.

In another example, it has been observed that an open neutral condition is likely to exist when one phase in a three-phase, wye-connected load with an open neutral condition has a voltage that exceeds the nominal voltage value for that phase by at least a specified amount while another phase has a voltage that is less than the nominal voltage value by more than that specified amount. The following discussion refers to this specified amount as a threshold. In the following discussion, the nominal voltage value for a phase is the specified value of electrical voltage for that phase according to the rating for the electrical power delivered to the customer premises. In an example, the nominal voltage value for a three-phase wye-connected power service delivered to a customer premises is rated to be 208 Volts (V). In that example, 208 V is the nominal voltage value used in the below described systems and methods.

In a further example, the nominal voltage value can be based upon a variable output voltage produced at the substation which is optionally able to be reduced by predicted distribution losses. In an example, a value of the nominal voltage can be based upon processing voltage readings from one or more smart meters on the same distribution system. In an example, the nominal voltage is able to be based on voltage readings from one or more smart meters that are close to the customer premises from the perspective of the distribution system, such as by being connected to and receiving electrical power from the same feeder line or lateral line of the electrical distribution system. In examples where nominal voltages are based on reported voltage readings from one or more smart meters, the sample rate of those one or more smart meters may optionally be increased. In an example, the sample rates of the one or more smart meters used to base nominal voltage values is able to be increased when the sample rate of a smart meter associated with an open neutral condition is increased.

In an example, a specified amount or threshold of ten percent (10%) of the nominal voltage value of the phase is used to determining a likely open neutral condition. In such an example, this threshold of ten percent (10%) is one half of the phase-to-phase threshold amount of twenty percent (20%) described above. In such an example, an open neutral condition is determined to likely exist when one phase has a measured voltage that exceeds the nominal voltage value for that phase by ten percent (10%) of that nominal voltage value, and another phase has a measured voltage that is less than the nominal voltage value of that phase by more than ten percent (10%) of that nominal voltage value. In an example, the determination of an open neutral condition is not based on measured differences between the measured and nominal voltage value of the third phase. The measured data of that third phase, however, may or may not indicate that its measured voltage also deviates from its nominal voltage value by more than the specified amount. In an example, an open neutral condition is declared even when the measured voltage of that third phase is within the specified amount, or threshold, of its nominal voltage value.

In an example, the voltages of each phase of the three-phase, wye-connected electrical power interface are measured by a smart meter that is installed at a customer premises. In some examples, that smart meter also measures other characteristics of the electrical consumption of the electrical load at the customer premises that is supplied by that particular smart meter. In general, an electric utility is able to install smart meters at many or even all customer premises to which power is supplied. These smart meters in an example are able to be remotely configured, such as by commands sent via the Advanced Metering Infrastructure (AMI) from a central monitoring center, to make specified measurements of the delivered electrical power at specified periods. In some examples, these measurements are able to include voltages of each of the three phases delivering power, total power consumed by the electrical load at the customer premises being provided electricity through that smart meter, other quantities, or combinations of these.

Once one of the above differences in voltages between two phases is determined, further characteristics of the electrical load are able to be used in some examples to further optionally verify the likely existence of an open neutral condition. For example, further verification is able to be based on one or more of determining that all phases have an appreciable voltage, determining that the electrical load is drawing an appreciable amount of power, determining that the voltage differences persist for a certain amount of time, determining a change in power consumption, customer initiated electrical service messages, other observations, or any combination of these. These verifications operate to preclude determining an open neutral condition when other factors may cause observed voltage differences from the nominal voltage value. For example, if the measured voltage of one of the three "hot" phases of a three-phase power connection that normally have the voltage rated for the service delivery is approximately zero (0) volts, that phase may be disconnected from the source. If an electrical load is not drawing appreciable power, the variation in voltages may not be due to an open neutral condition. By determining that the above described differences in voltages between two of the three phases lasts for at least a specified time duration, voltage variations that may result from transient conditions in the electrical load, such as starting of a large electric motor, are precluded from falsely being interpreted as a likely open neutral condition thereby reducing the false detection of open neutral conditions.

The below described systems and methods are able to process measurements made by smart meters that communicate measurements of electrical power parameters to a remote location at regular intervals, such as once per fifteen minutes, once per hour, or other preset rate that is designed in part not to overload the message communication capacity of the AMI network. In an example, a central monitoring center receives measurement data from a number of smart meters and stores the received measurement data into a database, the number of smart meters sending data to the central monitoring center may number in the millions or more. The processing described below is able to be performed based on any data received from various types of smart meters. In an example, the processing operates on a computer that receives measurement data as that measurement data is received from the smart meters. In another example, the processing is able to operate at least partially by processing previously received measurement data that was stored into a database. In such an example, the processing extracts that measurement data from that database. In some examples, processing of data stored in a database may be used to initially determine a likely open neutral condition at a customer premises. Based on that initial determination, the smart meter at the customer premises is able to be configured to more rapidly measure and report electrical power quantities to allow confirmation of the likely open neutral condition. These more rapidly measured and reported quantities are able to be processed to verify that an open neutral condition is likely to exist.

FIG. 1 illustrates an automated open neutral detection power distribution system 100, according to an example. The automated open neutral detection power distribution system 100 presents a simplified depiction of an electrical power distribution system in order to more concisely describe the relevant aspects of the below described systems and methods. It is to be understood that the below described systems and methods are readily implemented in the context of much more complex electrical power distribution systems that receive power from many generators and provide electrical power to many customer premises over a large geographical area.

In the depicted automated open neutral detection power distribution system 100, a generator 102 generates electrical power and provides the generated electrical power to a transmission/distribution system 104. The generator 102 is able to be any suitable type of generator that receives energy in any form including, for example, solar, wind power, fossil fuel, nuclear, other forms of energy, or combinations of these. In general, an electrical power distribution system is able to have any number of generators that are connected to various combinations of one or more transmission and/or distribution systems of various complexity levels. The transmission and/or distribution systems in an example convey electrical power in the form of three-phase Alternating Current (AC) that in some instances is at a voltage that is generally higher than the voltage delivered to electric power customers.

The illustrated transmission/distribution system 104 is connected to a transformer 106. In an example, the transformer 106 is located near customer premises 120 that are receiving electrical power. The transformer 106 converts the voltage of the AC power delivered by the transmission/distribution system 104 to a voltage that is to be delivered to customer premises 120. Examples of various customer premises include, but are not limited to, residential buildings, commercial buildings, industrial facilities, other electrical consumers, or combinations of these. In various examples, the customer premises 120 receive electrical power in any suitable form. The customer premises in general include an electrical meter that supports operations of Automatic Meter Reading (AMR) and the Advanced Meter Infrastructure (AMI). In an example, electrical meters that support AMR or that operate in conjunction with AMI are referred to as a "smart meters." Such smart meters are examples of reporting electrical meters that report measurements via a communications network that also provides communications among a number of other reporting electrical meters and a processor. In the illustrated example, customer premises 120 are connected to the transformer 106 via smart meter A 110. In general, a transmission and/or distribution system will connect to a large number of service transformers, such as the illustrated transformer 106. In an example, each transformer in turn is able to be connected to one or several smart meters to facilitate delivery of electrical power to respective customer premises.

In the illustrated example, smart meter A 110 receives Alternating Current (AC) electrical power in the form of wye ("Y") configured three-phase transformer connection 140. The smart meter A 110 in an example measures various parameters of the electrical power that is received from the transformer 106 and that is in turn delivered to the customer premises 120.

In the illustrated example, the output of transformer 106 is a wye-configured three-phase transformer that has a wye-configured three-phase transformer connection 140 to Smart meter A 110. The wye-configured three phase transformer connection 140 is an example of a service feed for the customer premises 120 and includes four (4) lines that include three "hot" lines illustrated as a phase A line 112, a phase B line 114, and a phase C line 116. As is generally understood, the phase A line 112, phase B line 114, and phase C line 116 each provide AC electrical power in that sequence with each phase offset by 120 degrees from the other phases. The wye-configured three phase transformer connection 140 also has a neutral line 118. As is generally understood, when a three-phase load is properly balanced, the neutral line 118 does not carry appreciable electrical current, thereby obscuring an open neutral condition in a properly balanced situation. In the case of an unbalanced three-phase load, however, the neutral line 118 may carry electrical current. The distribution and balancing of the load between the three phases is variable from premise to premise and largely the responsibility of the customer at the premises rather than the responsibility of the provider of the three phase electrical service.

The smart meter A 110 delivers electrical power service to the customer premises 120 via a wye-configured three-phase customer connection 142. The wye-connected three phase-customer connection 142 is an example of a three phase, wye-connected electrical power interface. The wye-configured three-phase customer connection 142 also has four (lines) similar to those described above for the wye-configured three-phase transformer connection 140. As is depicted in the automated open neutral detection power distribution system 100, the transformer 106 and smart meter A 110 both have electrical connections to earth ground 144. In the illustrated example, the wye-configured three-phase customer connection 142, in conjunction with the wye-configured three-phase transformer connection 140 and smart meter A 110, delivers poly-phase electrical power with a neutral conductor that is separate from at least two phases of the three-phase power being delivered to the customer premises 120. The smart meter A 110 is an example of a reporting electrical meter that sends voltage measurements of at least two phases of the three-phase electrical power delivered to the customer premises to a central processor.

In this illustrated example, an open neutral condition such as a neutral line break 148 is illustrated in the neutral line 146 between the smart meter A 110 and the customer premises 120. The neutral line break 148 causes that neutral line to be an open circuit and thus not able to carry electrical current. In another example, a neutral line break is alternatively, or additionally, able to be present in the neutral line 118 that connects the transformer 106 to the smart meter 110. The neutral line break 148 located before or after the smart meter 110 is an example of a condition that is identified by the below described automated processing.

The smart meter A 110 in an example is able to communicate via an Advanced Metering Infrastructure (AMI) 160. As is generally understood, electrical utilities are able to monitor and determine various quantities through the AMI based on various measurements made by the smart meters that are located at, for example, customer premises. The automated open neutral detection power distribution system 100 depicts a smart meter B 150 and a smart meter C 152, which are functionally similar to the smart meter A 110, that are also connected to the AMI 160. The AMI 160 allows any number of smart meters that are located at any location within a utility service area to communicate their measurements and other data to a monitoring center 170. In various examples, smart meter B 150, smart meter C 152 other smart meters (not shown), or combinations of these may be coupled to another transformer (not shown) that is also coupled to the transmission distribution system 104, or one or more of these smart meters may also be coupled to transformer 106. When, for example, smart meters are coupled to the same transformer 106 as smart meter A 110, those smart meters are considered to be electrically close to the smart meter A 110. Furthermore, the distribution system 104 includes feeders and laterals known to those familiar with the art, and smart meter A 110 would be respectively closer to smart meter B 150 or smart meter C 152 if one or both of these smart meters share common feeders, laterals, or both, with smart meter A 110 in the power distribution network providing power to two or three of these smart meters.

The monitoring center 170 in an example includes an automated computer processor that performs various functions as are described below. In some examples, the monitoring center 170 is able to physically house computing processors to perform at least some of the below described processing. In some examples, the monitoring center 170 is in communications with remote processors that perform some or all of the below processing. For example, some or all of the below described processing is able to be performed by remotely hosted processors, including virtual processors, that are in data communications with various components of the automated open neutral detection power distribution system 100. It is to be understood that the processing described herein is able to be performed by any suitable processing architecture that includes local processors, remote processors, a combination of local and remote processors that interact with each other, any other processing architecture, or combinations of these.

The monitoring center 170 in an example includes a processor that receives, via the AMI 160, voltage measurements for at least two phases of the poly-phase electrical power delivered to customer premises that have reporting electrical meters communicating over a communications network, such as the AMI 160, that provides communications among a number of reporting electrical meters and the processor at the monitoring center 170. Voltage measurements for at least two phases of poly-phase electrical power delivered to a customer premise, such as the above described customer premises 120, are made in an example by one reporting electrical meter, such as the above described smart meter 110, that is among a number of reporting electrical meters that are connected to the communications network, such as the above described AMI 160.

The monitoring center 170 includes an AMI interface 180. The AMI interface 180 is an interface to the AMI 160 and is able to send and receive data between one or more processors located at or accessible to the monitoring center 170 and any smart meter that is also in communications with the AMI 160. The AMI interface 180 is an example of a communications network interface coupled to a processor, memory, and communications network providing communications among a number of reporting electrical meters and one or more of those processors. In various examples, the AMI interface 180 receives measurements and other data from smart meters located at various customer premises, and is also able to send commands or other configuration data to one or groups of those smart meters to individually control the operation of the various smart meters.

The monitoring center 170 in an example includes various components to store, accumulate, perform various processes, or combinations of these, on the measurements and data received from various smart meters connected through the AMI 160 as well as based on data received from other sources. The monitoring center 170, or other facility in communications with the AMI 160, is also able to alter various configuration parameters of one or more smart meters that are connected to the AMI 160. For example, the monitoring center 170, or other facility, is able to reconfigure one particular smart meter, such as smart meter A 110, to perform and report one or more measurements with a different period.

The smart meter A 110 in an example is able to be configured to periodically measure specific parameters of the electrical power delivered to the customer premises 120. In an example, the smart meter A 110 is able to periodically measure and store the voltage of each of phase A line 112, phase B line 114, and phase C line 116 relative to a particular reference voltage, such as the voltage of the neutral line 118, another reference, or combinations of these. In some examples, electrical current of each of these phases, total electrical power delivered to the customer premises 120, other parameters, or any combinations of these, are able to be measured at specified times. In an example, each smart meter includes memory to store measurements that are made by equipment within the smart meter and the smart meter is also able to be configured to send the some or all of the stored measurements to the monitoring center 170.

The monitoring center 170 includes a number of data storage and data analysis components. In the illustrated example, the monitoring center 170 includes an AMI database 172 that stores data received from multiple smart meters that are connected to the monitoring center 170 via the AMI 160. The AMI database 172 is an example of a database of data reported by reporting electrical meters.

The illustrated monitoring center 170 also includes an open neutral detection processing component 174. As described in further detail below, the open neutral detection processing component 174 performs processing of data reported by smart meters at various locations to determine if it is likely that the three-phase connection neutral line is likely to be open or have high impedance. In various examples, the open neutral detection processing component 174 is able to receive data reported by smart meters through the AMI interface 180, as that data is received from the smart meters. In some examples, the open neutral detection processing component 174 is able to receive smart meter data that was previously reported and is stored in the AMI database. In some examples, the open neutral detection processing component 174 also causes commands to be sent to one or more smart meters through the AMI interface 180. A processor performing the open neutral processing component, such as is present in one or more computing resources located at or in communications with the monitoring center 170 is able to include an open neutral detection processor that performs at least part of the processing described below.

The monitoring center 170 also includes a customer service interface 176. The customer service interface 176 is able to be implemented in any configuration, including human-computer interface for a customer service representative, an automated voice attendant, other interface, or combinations of these. As discussed in further detail below, the customer service interface 176 is able to be used to facilitate receiving customer complaints, as may be entered by a customer service representative or received from a customer or other observer via any suitable communication. The customer service interface 176 in some example also facilitates providing notifications to customers, such as notifying customers that a likely open neutral condition has been determined at his or her premises.

In an example, the customer service interface 176 supports entry of customer complaints about their electrical service. The open neutral detection processing 174 in an example receives customer messages including complaint data from the customer service interface 176 and is able to perform processing to identify likely open neutral conditions based on received customer complaints. Examples of incorporating customer complaints into automated open neutral detection processing are described in further detail below.

The customer service interface 176 is also able to support providing information to customers, such as by prompting a customer service representative to call a customer, by initiating an automated voice call to a customer, by sending any type of communications, such as e-mail, text messaging, other communications, or combinations of these to a customer, sending other information to a customer by any technique, or by combination so of these.

The monitoring center 170 further includes a service dispatch component 178. In an example, the service dispatch component 178 in an example operates to initiate a service call to a customer premises 120 where the open neutral detection processing component 174 indicates that an open neutral is likely. In an example, the service dispatch component 178 is able to initiate the generation of a service ticket and send service ticket information to a service truck dispatch system 182. The service truck dispatch system 182 is able to, for example, dispatch a service truck with service personnel to a customer premises 120 from which smart meter reporting measurements indicate a likely open neutral condition. In the illustrated example, the customer service interface 176 and the service truck dispatch system 182 are examples of customer service systems that are able to receive an indication of a likely open neutral condition. In various examples, components within the monitoring center 170, including but not limited to the customer service interface 176, the service dispatch component 178, or both, are able to send indications of likely open neutral conditions to any destination, such as one or more of the customer premises 120, service truck dispatch system 182, other destinations, or combinations of these. In another example, a customer complaint may be indicative of an open neutral condition at the premises, however the smart meter reporting measurements may indicate that the open neutral condition is unlikely, thereby potentially avoiding generation of a service ticket and service truck dispatch for investigation and correction of an open neutral condition at the premises.

Figure 2:
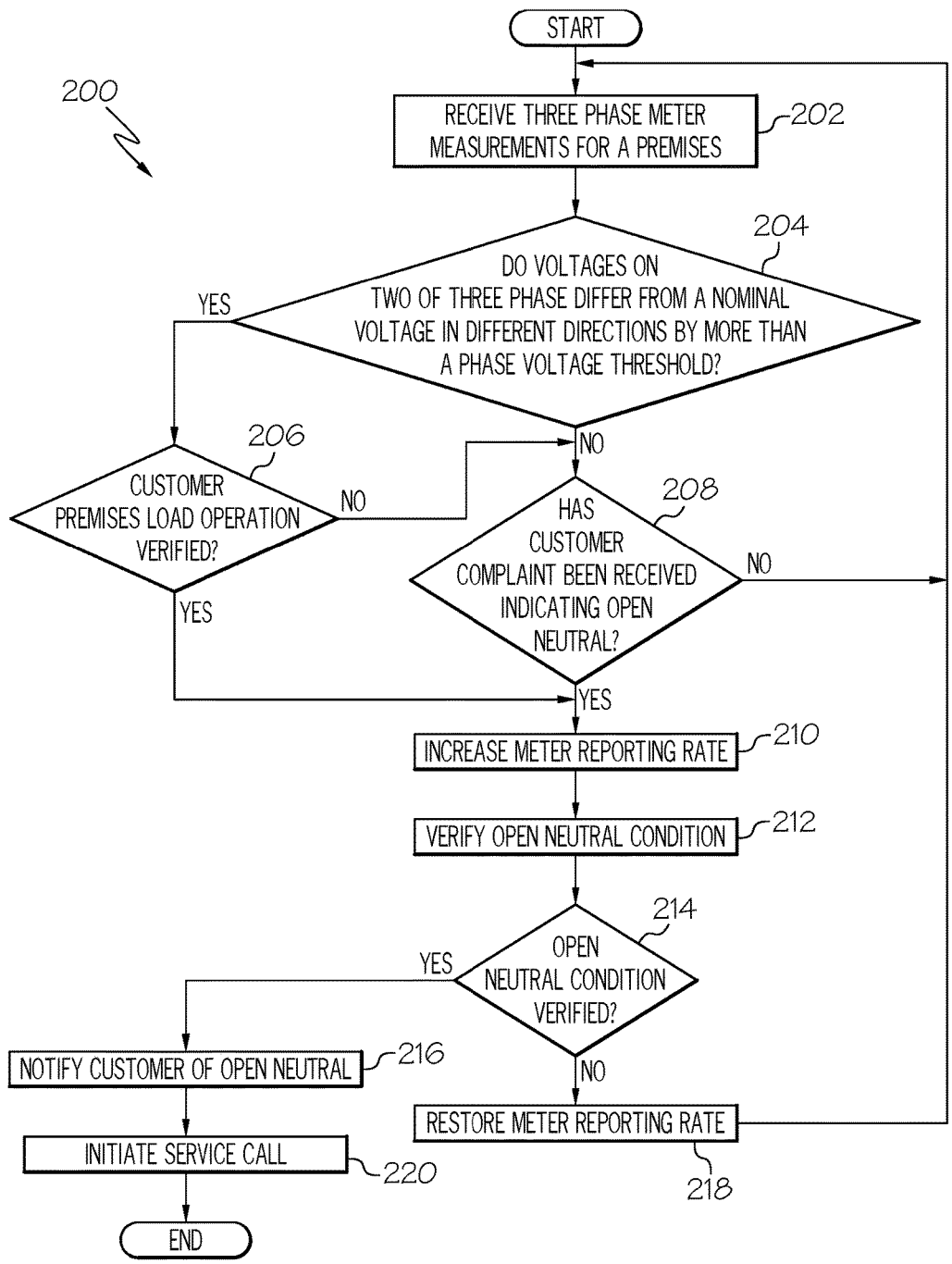
FIG. 2 illustrates an open neutral detection process, according to an example.

FIG. 2 illustrates an open neutral detection process 200, according to an example. The open neutral detection process 200 in an example is performed by the open neutral detection processing component 174 of the monitoring center 170 described above. In an example, the open neutral detection process 200 operates in conjunction with data received by the AMI database 172, stored in the AMI database 172, with other data measured by one or more smart meters connected to the AMI 160, or with combinations of these types of data.

The below described open neutral detection process 200 depicts processing of electrical power measurement data reported by, for example, a smart meter via an AMI to identify a likely open neutral condition at a particular customer premises that is receiving three-phase electrical power via that reporting smart meter. The example open neutral detection process 200 determines if particular voltage variations are observed at a smart meter for a customer premises, determines if further power consumption characteristics are present at the customer premises that can further verify the likely open neutral condition indicated by the voltage variation observations, and performs actions in response to detecting a likely open neutral condition at a customer premises receiving electrical power through the meter reporting the determined voltage variations.

The open neutral detection process 200 begins by receiving, at 202, three-phase meter data for a customer premises. In an example, the three-phase meter data includes respective voltage and electrical current measurements for each of the three phases being monitored by the meter. In the automated open neutral detection power distribution system 100, the smart meter A 110 reports the electrical current and voltage of phase A line 112, phase B line 114, and phase C line 116. In various examples, receiving the three-phase meter data includes one or more of receiving the data items as they are reported by a smart meter via the AMI 160, retrieving meter data from the AMI database 172, receiving recently measured or stored meter measurement data from any source, or combinations of these. Receiving these smart meter measurements that include voltage readings for at least two phases of electrical power delivered to a customer premises is an example of receiving at a processor from a reporting electrical meter, via a communications network providing communications among a plurality of reporting electrical meters and the processor, respective voltage measurements of at least two phases of poly-phase electrical power delivered to a customer premises.

The open neutral detection process 200 determines, at 204, if the measured voltages on two of the three phases differ from a nominal voltage value in different directions by more than a threshold. It has been observed that deviations of the voltages on two of the three phases by more than a particular threshold may indicate an open neutral condition wherein the neutral line of three phase, wye-connected electrical power interface is open circuited or has a high impedance.

In one example, the nominal voltage value is a normal value of electrical voltage of the electrical service delivered to the customer premises. In an example, three-phase electrical service delivered to a customer premises is specified to have a rated voltage or 208 Volts (V). In that example, the nominal voltage value is 208 V. In some examples, the nominal voltage value is any measure of average, mean, composite, or other measurement of voltage for the electrical phase being measured relative to a suitable reference, such as the neutral line or earth ground. In further examples, the nominal voltage value is able to be specified by any suitable quantity such as, but not limited to, peak-to-peak voltages, other voltage measures, or combinations of these. In some examples, the nominal voltage value is able to be determined based on voltage measurements reported by this meter in the past, based on voltage readings reported by other meters receiving electrical power from a source common with this smart meter (such as being connected to the same distribution transformer), based on other techniques, or combinations of these.

An example of determining that the measured voltages on two of the three phases differ from a nominal voltage value in different directions by more than a threshold includes determining that the voltage of a first phase is at least ten percent (10%) higher than the nominal voltage value for that phase, and a second phase is at least ten percent (10%) less than the nominal voltage value for that phase. In an example, any one of the three phase lines, other than the neutral line, of the three phase, wye-connected electrical power interface is able to be the first phase and any phase of the other two phases is able to be the second phase. In an example, determining a likely open neutral condition is able to be independent of a difference of voltage relative to the nominal voltage value on the third phase of a three phase power connection.

In an example, the nominal value need not be required and the determination made on the voltages exceeding corresponding upper and lower thresholds. For example, in a 208 volt system if the voltage value of one phase were measured to be greater than an upper threshold set at 228.8 volts and the measured voltage value of another phase were less than a lower threshold set at 187.2 volts, then the condition determined above, at 204, would be met and the need for processing to determine a nominal voltage for that determination is eliminated. In this example, it is also observed that a phase to phase voltage amount corresponds to 228.8 less 187.2, or 41.6 volts. Thus, a likely open neutral condition is able to also be detected by determining that a difference between the first voltage measurement of the first phase and the second voltage measurement of the second phase exceeds a phase-to-phase threshold amount on only two of the three phases.

If it is determined that the measured voltages on two of the three phases differ from a nominal voltage in different directions by more than a threshold, a determination is made as to the verification of the operation of the electrical load in the customer premises is verified, at 206. In some examples, conditions other than an open neutral condition are able to cause measured voltages are able to differ from the nominal voltage value in different directions by the threshold. In an example, verification of certain characteristics of the operation of an electrical load on the customer premises when the measured voltages are observed to differ from the nominal voltage value in different directions by a threshold is able to further support a determination that the measured differences in voltages are likely due to an open neutral condition. Examples of verifications of the operation of the electrical load in the customer premises are described in further detail below.

In an example, when an observation is first made that voltages on two of the three phases differ from a nominal voltage value in different direction, verification of the premises load may further include determining if there is a change in power consumption at a time when the voltage differences occur. For example, a drop in power consumption that accompanies a change in the voltages on two of the three phases such that the differences from the nominal voltage value is more than a threshold is further verification in some examples of an open neutral condition.

If it is determined that measured voltages are observed to not differ from the nominal voltage value in different directions by a threshold, or if the operation of the electrical load in the customer premises is not verified, a determination is made, at 208, as to whether a customer complaint, or customer inquiry message, has been received that is indicative of an open neutral condition. In an example, customer complaints are received in conjunction with the customer service interface 176 described above. If no customer complaints have been received, or if the customer inquiry message is not indicative of the open neutral condition, then the open neutral detection process 200 returns to receiving, at 202, three phase meter data for a customer premises and continues with the above described processing.

In an example, receipt of customer complaints that may indicate an open neutral condition, or verification of the operation of the electrical load in the customer premises, provides a sufficient likelihood that an open neutral condition may exist at the customer premises. Based on this likelihood, further monitoring of the voltages of different phases of the wye-connected three-phase power being delivered to the customer premises is performed to further verify the likelihood of an open neutral line condition at the customer premises.

In an example of normal operations, many smart meters, such as smart meter A 110, are normally configured to perform certain measurements at particular intervals and accumulate those measurements into a local memory of the smart meter without immediately sending those measurements to a monitoring center 170. These smart meters are configured to normally send these accumulated measurements to the monitoring center with a frequency that is less than the frequency at which the measurements are made. These measurements are able to include, for example, measurements of voltages of each phase, electrical current flowing in each phase, other measurements, or combinations of these.

In an example, smart meters for many customer premises are normally configured to perform measurements every 15 minutes and accumulate that data into an internal memory. These smart meters are also configured to send these accumulated measurements, via the AMI 160, to the monitoring center 170 at specified intervals. In an example, accumulated measurements are normally sent to the monitoring center 170 every four (4) hours.

Based on receipt of a customer complaint indicating an open neutral condition, at 208, or based on verification of the operation of the electrical in the customer premises, at 206, a reporting rate for the electrical meter at the customer premises associated with the customer complaint or verification is increased, at 210. In an example, the measurement rate of a particular meter for a customer premises for which an open neutral line condition is determined to be likely is able to be increased to a suitable rate, such as one measurement each minute. That particular meter is also able to be configured to report these measurements to the monitoring center 170 at a more frequent rate, such as one measurement every minute while the remaining smart meters of the AMI network continue to sample at once per fifteen minutes. In an example, the reporting rate of that particular meter may be configured to send each measurement to the monitoring center 170 as the measurement is made. In a further example, that particular smart meter is able to be configured to accumulate a small number of measurements and send that specified number of measurements to the monitoring center 170 after that number has been accumulated. In general, the reporting rate of the electrical meter at the customer premises is able to be increased to report measurements at any suitable rate.

The open neutral condition at the customer premises is verified, at 212. Examples of verification of the open neutral condition at the customer premises are described in further detail below. In an example, this verification includes determining that the voltages of two of the three phases differ from their nominal voltage values by a threshold for at least a particular time duration while the operation of the electrical load at the customer premises is verified.

A determination is made, at 214, as to whether the open neutral condition is verified. This determination in an example is based on the verification, at 212, that is described in further detail below.

If the open neutral condition is not verified, the reporting rate for the smart meter is restored, at 218. The open neutral detection process 200 returns to receiving, at 202, three phase meter data for the premises and continues with the processing described above.

Returning to determining, at 214, whether the open neutral condition is verified, the customer in some examples is notified, at 216, of a likely open neutral condition at their premises. In one example, a customer would not be notified if a compliant had not been received from the customer, or if the customer inquiry message was not indicative of the open neutral condition, thereby affecting a service call without troubling the customer. In some examples, such as with an industrial customer, the customer may have electricians on site to further investigate, and possibly attend to, an open neutral condition. A service call is initiated, at 220. In an example, a service call is initiated in conjunction with the service dispatch component 178 described above. In some examples, the reporting rate of the smart meter at the customer premises may be adjusted or returned to its normal value as part of the service call. The open neutral detection process 200 then ends.

A variation of the open neutral detection process 200 of FIG. 2 is an example of a method of controlling communications capacity usage by a multiplicity of smart meters in a smart grid electrical distribution network that utilizes a wireless data communications network having a communications capacity for communicating bandwidth occupying messages from the multiplicity of smart meters to monitoring center. In the present discussion, a communications capacity of a network refers to the amount of messages, data, other information items, or combinations of these, that the network is able to communicate over a particular time period. Network capacity utilization in an AMI network may be complicated by message duplications associated with routing messages in a wireless mesh system typical to those employed in AMI systems. In an example of this variation, the method operates at the monitoring center 170 to set a rate of message generation for each smart meter in a multiplicity of smart meters to a first rate. A number of messages are then received that include at least one message not including a signal of a determination of a likely fault associated with the electrical distribution network. In an example, a likely fault may occur that is able to be any fault associated with an electrical distribution system including and open neutral, a high impedance or open in a distribution line or a low impedance or short to ground or another transmission line or other irregular or fault conditions known to those familiar with the art. A particular message in the plurality of messages is processed to determine a likely fault with the electrical distribution network. Then, the message generation rate of the at least one smart meter is increased to a second rate that is greater than the first rate. The likely fault is validated based on that processing, and an indication of the likely fault to a customer service system based upon the validating. The first rate may be based upon the communication capacity of the wireless network, and the increasing does not increase the message generation rate of other smart meters in the multiplicity of smart meters except for particular smart meter, thereby controlling the communications capacity utilization of the communication system used to validate the likely fault. Otherwise, the communication capacity may be exceeded if all meters were increased to the second rate in order to validate the likely fault.

A variation of the open neutral detection process 200 is an example of a process to selectively notify a customer, where a likely open neutral condition is detected and verified based upon smart meter messages and which may or may not be based upon customer inquiry messages. In a variations of the depicted open neutral detection process 200, sending customer notification messages, at 216, is based on either having received a customer inquiry, complaint or possible indications contained in the customer inquiry or complaint. In this variation, if the customer inquiry or complaint message, as would be determined to be received at 208, contained information indicative of an open neutral, then notification messages are sent to the customer, at 216. In an example of this variation, if no complaint or inquiry was received, as was determined at 208, or if such an inquiry or complaint was not indicative of an open neutral fault, then in one example the notification depicted at 216 is not sent to the customer. The selective notification process may be used not only with open neutral fault conditions, but also with any number of electrical distribution system faults with the determination of the likely fault is made at least in part based upon messages received from a smart meter associated with the customer's premises. Other potential fault conditions include detection of a high impedance or open in a distribution line or a low impedance or short to ground or another transmission line or other irregular or fault conditions known to those familiar with the art.

Figure 3:
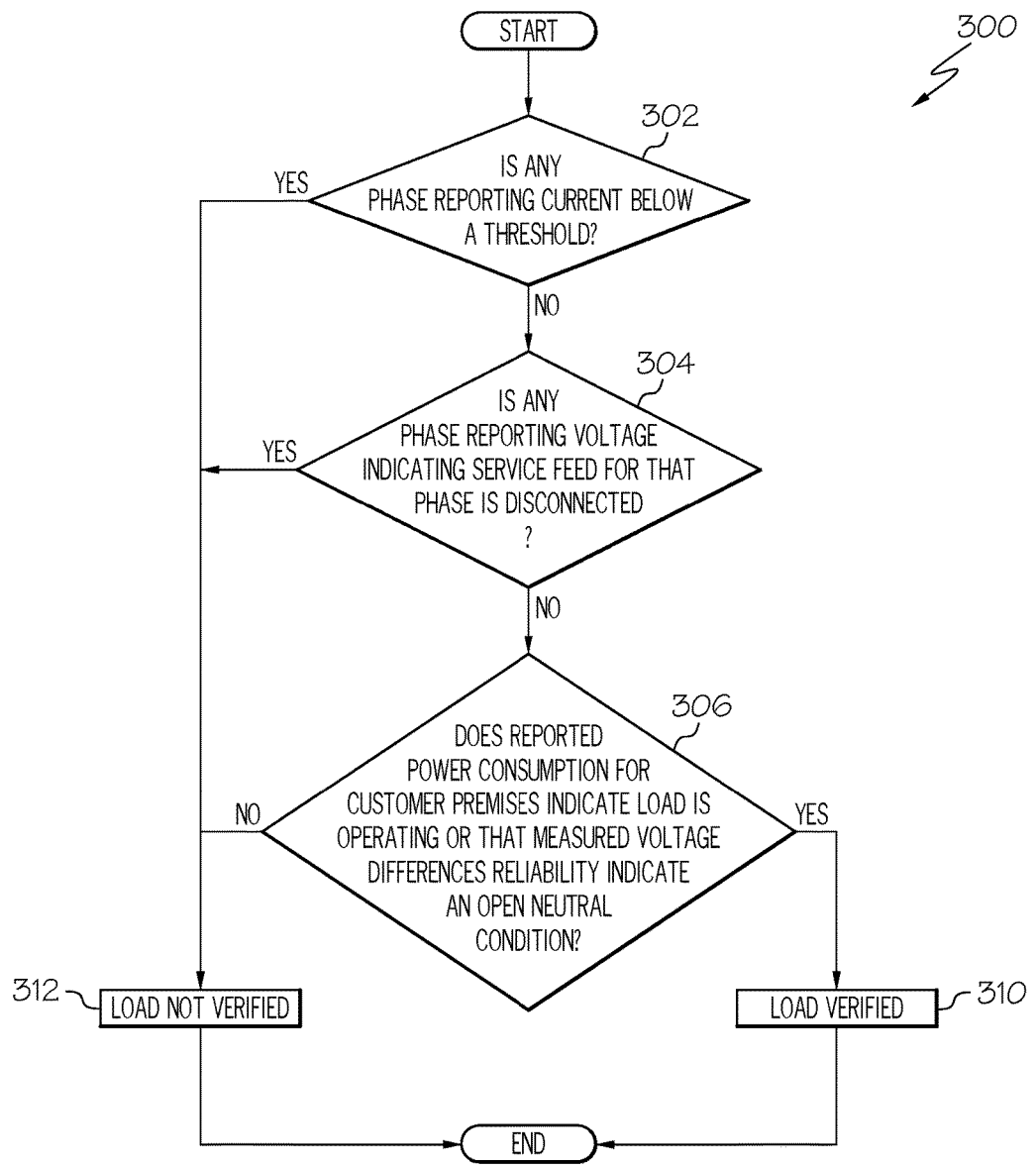
FIG. 3 illustrates a customer premises load operations verification process, according to an example.

FIG. 3 illustrates a customer premises load operations verification process 300, according to an example. The customer premises load operations verification process 300 is an example of processing included in a determining the verification of the operation of an electrical load at a customer premises 206, as is described above with regards to the open neutral detection process 200.

The customer premises load operations verification process 300 determines, at 302, if the electrical current measurement reported by a smart meter for any phase is below a threshold. In an example, this threshold is a suitably low value to reflect that the phase is not drawing a sufficient amount of electrical current to have an open circuit condition cause the above described differences in phase voltages. In various examples, any suitable threshold based on the expected characteristics of the load is able to be used. In an example, this determination uses a threshold of one percent (1%) of the rated current for the service delivered to the customer premises.

In an example, one or more phases reporting a low electrical current value may indicate an open circuit for that phase. In an example of all phases reporting a low electrical current value, the electrical load at the customer premises is likely not operating and thus measured voltage variations on two or more phases may not likely be attributed to an open neutral condition.

If the electrical current measurement reported by a smart meter for any phase is not below the threshold, a determination is made, at 304, as to whether the voltage measurement reported by a smart meter for any phase indicates that the service feed for that phase is disconnected. In an example, this determination is made by determining that the voltage measurement reported for any phase is below a threshold. This threshold in an example is selected such that a reported voltage that is below this threshold for one or more phases is likely to indicate that no electrical power is being delivered on that phase to the customer premises. In an example, a voltage less than fifty percent (50%) of the rated voltage for the customer premises is used as a threshold for this determination. A voltage below this threshold may indicate, for example, that the service feed line for that phase is disconnected from its service transformation, such as the service transformer 106 discussed above. A voltage below this level may also indicate a disruption in power delivery to the premises, such as due to problems with the power distribution grid.

If the voltage measurement reported by a smart meter for any phase is not below the threshold, a determination is made, at 306, as to whether the power consumption reported by the smart meter at the premises indicates that the load at the customer premises is in operation, or that the power drawn by the load is high enough to cause measured voltage differences to reliably indicate an open neutral condition. In some examples, the load at the premises is determined to be in operation when the smart meter measures the power consumed by the customer premises to be above one percent (1%) of the rated power for the customer premises.

In some examples, differences in reported voltages between two phases is more reliable when the electrical load in the customer premises is drawing more than a certain threshold of power. In some examples, an automatic determination of an open neutral condition is not made when the load at the customer premises is not drawing much power. In an example, determinations are not made unless the load is drawing ten percent (10%) of the rated load for the premises.

In various examples, a failure to verify the load is able to be based on either of the above determinations, i.e., that 1) the load is not operating, or 2) that measured voltage differences do not reliably indicate an open neutral condition. In some examples, both determinations are made and which determination causes the verification to fail is recorded. In further examples, verification of the load, and thus verification that determined voltage differences between phases of the poly-phase electrical power are more reliably indicative of an open neutral condition, is able to be based on any minimum level of electrical power draw for the customer premises.

In the illustrated customer premises load operations verification process 300, fails to verify the load if any of the above determinations is false. In this example, the load is not verified, at 312, when a determination that any phase is reporting, at 302, electrical current of any phase below a threshold, the reporting voltage indicates, at 304, the service feed for that phase is disconnected, or the power consumption for the customer premises indicates, at 306, that the load is not operating or that measured voltage differences do not reliably indicate an open neutral condition. If the load is determined to be operating or that measured voltage differences does reliably indicate an open neutral condition, the load is verified, at 310. The customer premises load operations verification process 300 illustrated in this example then ends.

The illustrated customer premises load operations verification process 300 is an example of verifying the operation of an electrical load in a customer premises based upon a number of types of measurements reported by a smart meter for that customer premises. In further example, the order of the determinations illustrated in the customer premises load operations verification process 300 is able to differ. In other examples, the verification of the operation of the electrical load in the customer premises is able to include fewer determinations than are illustrated in the customer premises load operations verification process 300. In some examples, additional determinations, different determination, or combinations of these are able to be used to determine the verification of the operation of the electrical load at a customer premises.

Figure 4:
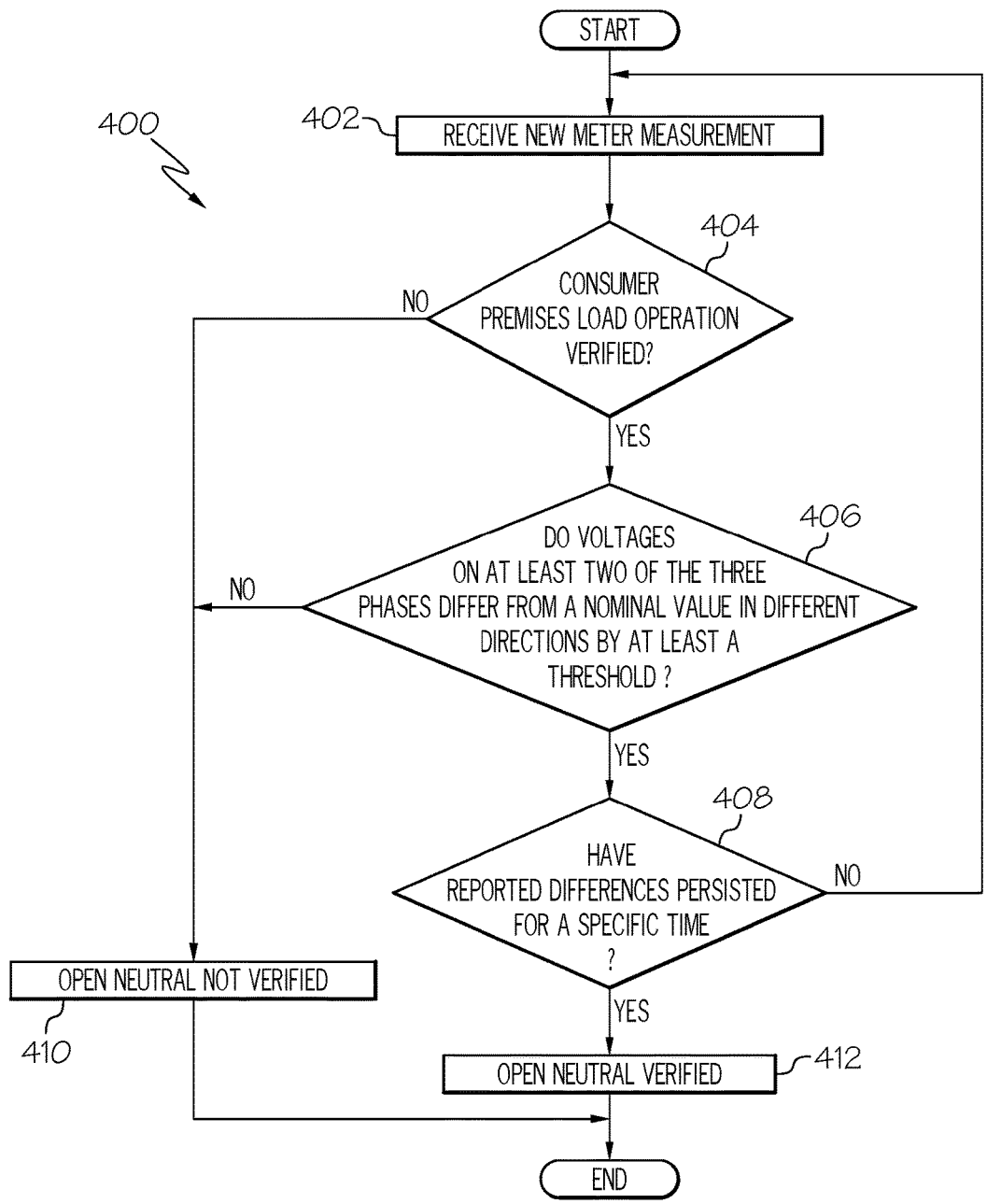
FIG. 4 illustrates an open neutral condition verification process, according to an example.

FIG. 4 illustrates an open neutral condition verification process 400, according to an example. The open neutral condition verification process 400 is an example implementation of the open neutral condition verification 212 described above with regards to the open neutral detection process 200. As described below, part of the open neutral condition verification process 400 performs a repetitive process that iterates over a specified time duration to verify that determined voltage differences persist for that specified time duration.

The open neutral condition verification process 400 receives, at 402, new meter measurements from a smart meter at a customer premises. It is noted that prior to entry into the open neutral condition verification process 400, the measurement rate, reporting rate, or both, for that smart meter in some examples has been increased. In various examples, the open neutral condition verification process 400 is able to process smart meter measurement data that are made or reported at any rate. It is to be noted that as the open neutral condition verification process 400 iterates during the below described specified time duration, successive iterations of receiving new meter measurements causes a time sequence of voltage measurements to be received, where that time sequence of voltage measurements covers at least that time duration. This time sequence is able to be received either as smart meters report these voltage measurements, or this time sequence is able to be received by retrieving a number of voltage measurements from a database of previously received and stored smart meter measurements.

A determination is made, at 404, if the operation of the electrical load at the customer premises is verified. This determination in an example is able to be based on processing described above with regards to the customer premises load operations verification process 300 that is performed on the smart meter measurements that are performed and reported at an increased reporting rate as was set at 210 discussed above. In some examples, a different verification process may be used to verify that the load at the customer premises is drawing sufficient electrical power to result in reliable determination of a likely open neutral condition based upon the processing of measured phase voltage data.

A determination is made, at 406, as to whether voltages on at least two of the three phases differ from a nominal voltage value in different directions by at least a threshold. In an example, this determination is based on the nominal voltage value and threshold value discussed above with regards to the determination 204 within the open neutral detection process 200. In further examples, this determination merely determines whether the voltages of two phases differ by a phase-to-phase threshold such as is described in further detail below. If the load operation is not verified, at 404, or the voltages are determined to not differ by this threshold, the open neutral condition is not verified, at 410, and the open neutral condition verification process 400 ends. The phase-to-phase threshold value of step 406 may be equal to the phase-to-phase threshold value used in the determination, at 204, or may be different value. For example, the value of the threshold used in the determination, at 406, may be larger than the value used at 204 thereby causing the determination at 204 to initially detect the likely open threshold while the threshold used in the determination of 406 requires more of a voltage differential at a higher sample rate to verify the likely open neutral condition.

Returning to the determination, at 406, if the voltages are determined to differ by that threshold, a determination is made, at 408, as to whether the reported differences persisted for a specified time. In an example, this determination verifies that the voltages on the two phases differ by the specified threshold for at least four (4) hours. In further examples, any suitable time duration is able to be used. Ensuring that these voltage differences persist for a specified time duration reduces the likelihood that transient electrical load conditions can erroneously cause a determination of an open neutral condition. If it is determined that these reported differences have not persisted for the specified time, the open neutral condition verification process 400 returns to receiving, at 402, a new meter measurement. In an example, this new meter measurement is a subsequent meter measurement that is performed after the meter measurement received in a previous iteration of this processing. If it is determined that these reported differences persisted for the specified time, the open neutral condition is verified, at 412 and the open neutral condition verification process 400 ends.

Figure 5:
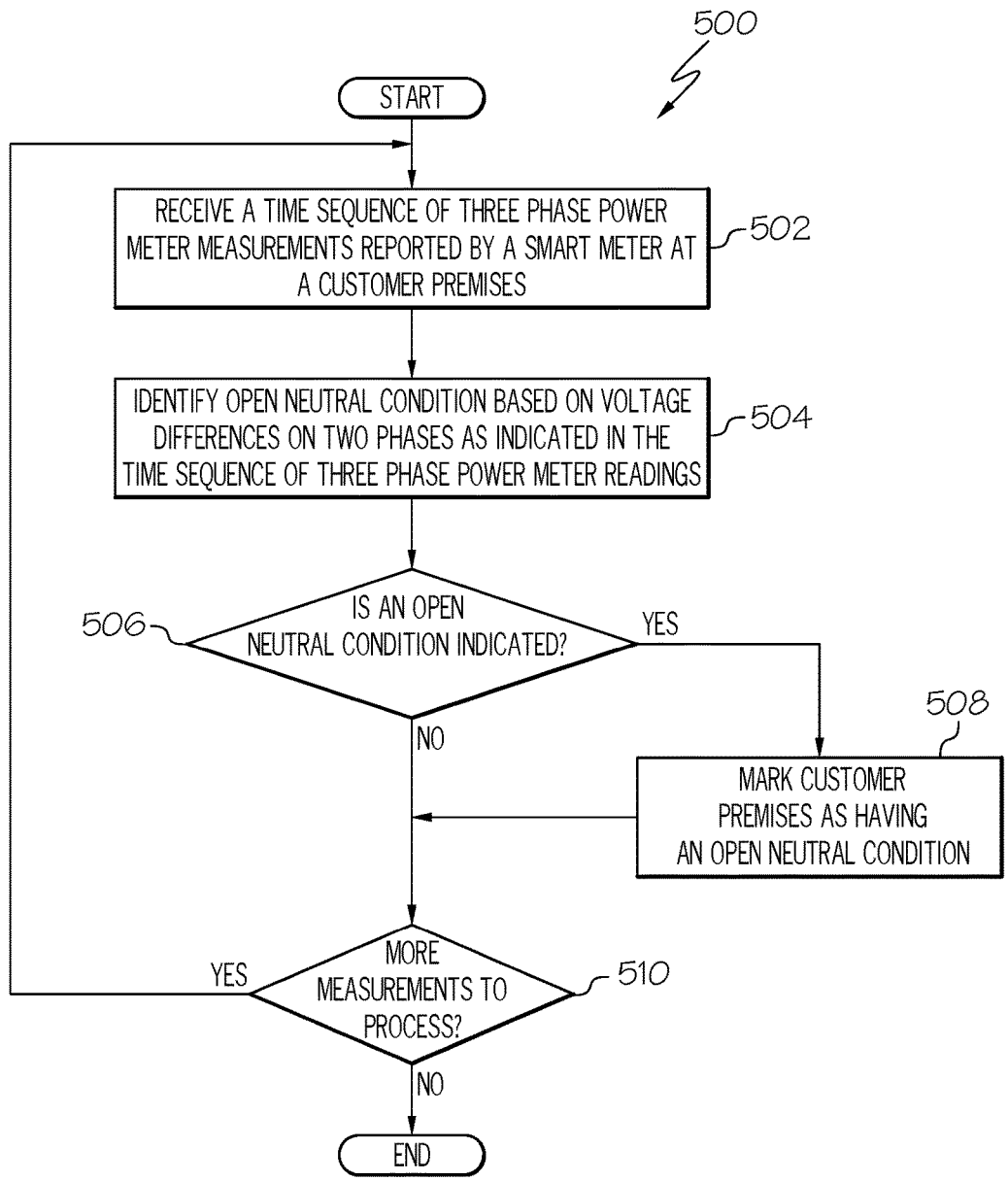
FIG. 5 illustrates an open neutral detection process based upon accumulated data, according to an example.

FIG. 5 illustrates an open neutral detection batch process 500, according to an example. The open neutral detection batch process 500 illustrates an example of processing of a set of power measurement data that is accumulated and reported by one or more smart meters. In an example, the open neutral detection batch process 500 is performed by the above described open neutral detection processing component 174. In an example, one or more smart meters perform measurements and send data to the monitoring center 170. Measurement data received by the monitoring center 170 in an example is stored in an AMI database 172. The electrical power measurement data made by smart meters at a number of customer premises in an example is accumulated in the AMI database 172 and is available for various types of data analyses. The open neutral detection batch process 500 is an example of a data analysis process performed on data stored in the AMI database 172.

The open neutral detection batch process 500 receives, at 502, a time sequence of three-phase power meter measurements that are reported by a smart meter at a customer premises. In an example, receiving these measurements includes retrieving measurement data that is stored in the AMI database 172. In further examples, retrieving these measurements is able to include any suitable technique to receive the data. In an example, this time sequence of three-phase power meter measurements includes a sequence of meter measurements that include measurements made by one smart meter for a customer premises where each measurement was made at a different time point. In an example, each meter measurement in the sequence of three-phase power meter measurements includes measurements that were made at consecutive time points. In an example, each of the three-phase power meter measurements include one or more of voltage measurements for each of the three phases, electrical current flowing on each phase, totally power consumption, other measurements, or any combination of these.

An open neutral condition is identified, at 504, based on voltage differences in two phases as indicated in the time sequence of three-phase power meter measurements. An example of such identifying of an open neutral condition includes performing the above described open neutral detection process 200 on the received time sequence of three-phase power meter measurements. As described above, an open neutral condition in a three phase, wye-connected electrical power interface can be identified based on one phase having a voltage that is greater than the nominal voltage value for that phase by more than a threshold amount and another phase having a voltage that is less than the nominal voltage value for that phase by more than the threshold amount. As described in further detail below, this determination is able to be made based on whether the voltage difference between two phases differs by at least a phase-to-phase threshold without regard to a nominal voltage value associated with those voltages.

A determination is made, at 506, as to whether an open neutral condition is indicated. This determination is based upon the previously performed identification. In an example, this identification includes performing the open neutral detection process 200 and this determination is based on processing and determinations made during that process.

If it is determined that an open neutral condition is indicated, the customer premises is marked, at 508, as having an open neutral condition. In some examples, marking the customer premises as having an open neutral condition causes other actions to take place, such as notifying the customer, initiating a service call to the customer premises to further investigate and repair if necessary the open neutral condition or perform other repairs that may be needed, other actions, or any combination of these.

Returning to the determination, at 506, if it is determined that an open neutral condition is not indicated, or after marking the customer premises as having an open neutral condition, at 508, a determination is made, at 510, as to whether there are more measurements to process. In various examples, further iterations of the open neutral detection batch process 500 are able to be performed on one or more of a time sequence of three-phase meter measurements from the same smart meter as the measurements previously received and process but which include measurements made during a different time interval, a time sequence of three-phase meter measurements from a different smart meter, other meter measurements, or any combination of these.

Figure 6:
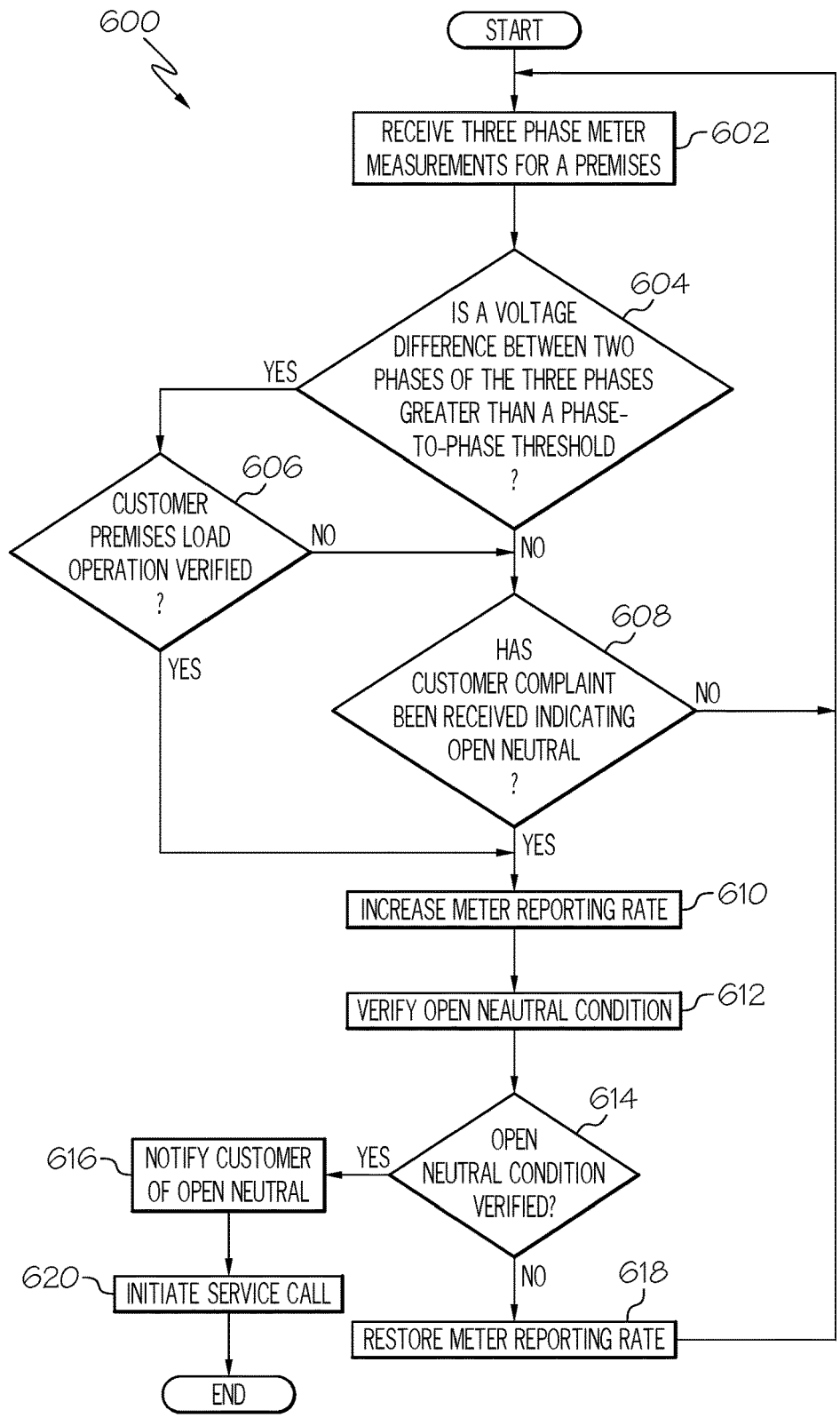
FIG. 6 illustrates an alternative open neutral detection process, according to an example.

FIG. 6 illustrates an alternative open neutral detection process 600, according to an example. The alternative open neutral detection process 600 in an example is performed by the open neutral detection processing component 174 of the monitoring center 170 described above. In an example, the alternative open neutral detection process 600 operates in conjunction with data received by the AMI database 172, stored in the AMI database 172, with other data measured by one or more smart meters connected to the AMI 160, or with combinations of these types of data. The alternative open neutral detection process 600 in an example is a variation of the open neutral detection process 200 discussed above.

The below described alternative open neutral detection process 600 depicts processing of electrical power measurement data reported by, for example, a smart meter via an AMI to identify a likely open neutral condition at a particular customer premises. The example alternative open neutral detection process 600 determines if particular voltage variations are observed at a smart meter for a customer premises, determines if further power consumption characteristics are present at the customer premises that can further verify the likely open neutral condition indicated by the voltage variation observations, and performs actions in response to detecting a likely open neutral condition at a customer premises receiving electrical power through the meter reporting the determined voltage variations.

Three-phase meter data for a customer premises are received, at 602. In an example, the three-phase meter data includes respective voltage and electrical current measurements for each of the three phases being monitored by the meter. In the automated open neutral detection power distribution system 100, the smart meter A 110 reports the electrical current and voltage of phase A line 112, phase B line 114, and phase C line 116. In various examples, receiving the three-phase meter data includes one or more of receiving the data items are they are reported by a smart meter via the AMI 160, retrieving meter data from the AMI database 172, receiving recently measured or stored meter measurement data from any source, or combinations of these.

A determination is made, at 604, as to whether a voltage difference between two phases of the three phases is greater than a phase-to-phase threshold. In an example, the threshold is a function of the voltages reported as being present on the two phases for which the difference is determined. In an example, twenty percent (20%) of an average of the voltages measured and reported for these two phases is used as this phase-to-phase threshold. In an example, any two of the three phase lines, other than the neutral line, of the three phase, wye-connected electrical power interface is able to be the two phases whose voltage difference is determined to exceed the phase-to-phase threshold. In an example, determining a likely open neutral condition need not be based on a voltage measurement of the remaining third phase.

If it is determined that the measured voltages on two of the three phases differ by more than the phase-to-phase threshold, a determination is made as to the verification of the operation of the electrical load in the customer premises is verified, at 606. This determination in an example includes processing described above for the customer premises load operations verification process 300.

If it is determined that the measured voltages on two of the three phases differ my more than the phase-to-phase threshold, or if the operation of the electrical load in the customer premises is not verified, a determination is made, at 608, as to whether a customer complaint, or a customer inquiry message, has been received that is indicative of an open neutral condition. If no customer complaints have been received, the alternative open neutral detection process 600 returns to receiving, at 602, three phase meter data for a customer premises and continues with the above described processing.

In an example, receipt of customer complaints that may indicate an open neutral condition, or verification of the operation of the electrical load in the customer premises, provides a sufficient likelihood that an open neutral condition may exist at the customer premises. Based on this likelihood, further monitoring of the voltages of different phases of the wye-connected three-phase power being delivered to the customer premises is performed to further verify the likelihood of an open neutral line condition at the customer premises.

Based on receipt of a customer complaint indicating an open neutral condition, at 608, or based on verification of the operation of the electrical in the customer premises, at 606, a reporting rate for the electrical meter at the customer premises associated with the customer complete or verification is increased, at 610. In an example, the measurement rate of a particular meter for a customer premises for which an open neutral line condition is determined to be likely is able to be increased to a suitable rate, such as one measurement each minute. That particular meter is also able to be configured to report these measurements to the monitoring center 170 at a more frequent rate, such as one measurement every minute. In an example, the reporting rate of that particular meter may be configured to send each measurement to the monitoring center 170 as the measurement is made. In a further example, that particular smart meter is able to be configured to accumulate a small number of measurements and send that specified number of measurements to the monitoring center 170 after that number has been accumulated. In general, the reporting rate of the electrical meter at the customer premises is able to be increased to report measurements at any suitable rate.

The open neutral condition at the customer premises is verified, at 612. In an example, verification of the open neutral condition at the customer premises includes processing similar to that described above with regards to the open neutral condition verification process 400. This verification for the alternative neutral detection process 600 determines if the measured voltage difference between two phases exceeds the phase-to-phase threshold for the specified time.

A determination is made, at 614, as to whether the open neutral condition is verified. This determination in an example is based on the verification, at 612.

If the open neutral condition is not verified, the reporting rate for the smart meter is restored, at 618. The alternative open neutral detection process 600 returns to receiving, at 602, three phase meter data for the premises and continues with the processing described above.

Returning to determining, at 614, whether the open neutral condition is verified, the customer in some examples is notified, at 616, of a likely open neutral condition at their premises. In some examples, such as with an industrial customer, the customer may have electricians on site to further investigate, and possibly attend to, an open neutral condition. A service call is initiated, at 620. In an example, a service call is initiated in conjunction with the service dispatch component 178 described above. In some examples, the reporting rate of the smart meter at the customer premises may be adjusted or returned to its normal value as part of the service call. The alternative open neutral detection process 600 then ends.

Figure 7:
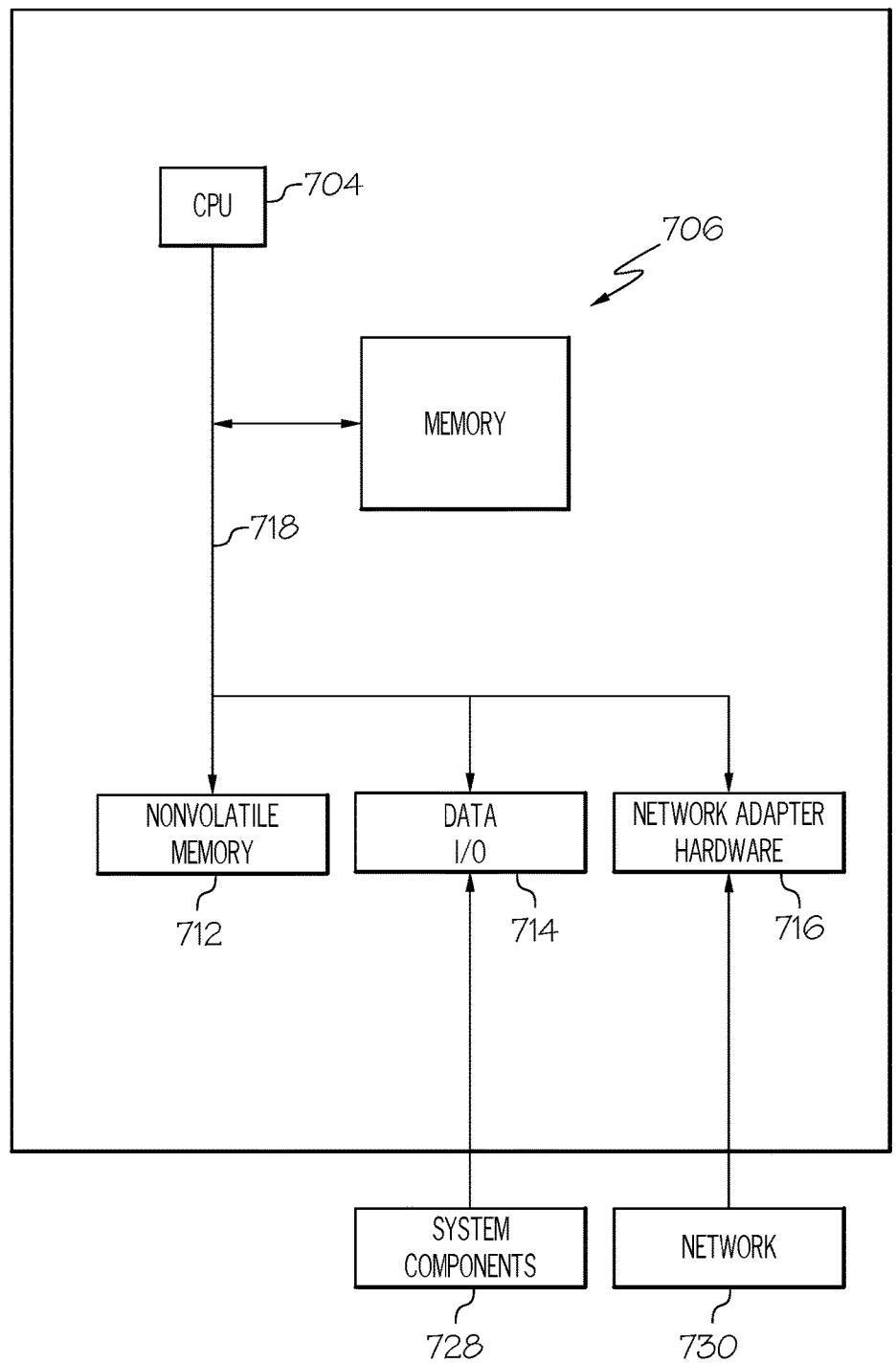
FIG. 7 illustrates a block diagram illustrating a processor, according to an example.

FIG. 7 illustrates a block diagram illustrating a processor 700 according to an example. The processor 700 is an example of a processing subsystem that is able to perform any of the above described processing operations, control operations, other operations, or combinations of these.

The processor 700 in this example includes a CPU 704 that is communicatively connected to a main memory 706 (e.g., volatile memory), a non-volatile memory 712 to support processing operations. The CPU is further communicatively coupled to a network adapter hardware 716 to support input and output communications with external computing systems such as through the illustrated network 730.

The processor 700 further includes a data input/output (I/O) processor 714 that is able to be adapted to communicate with any type of equipment, such as the illustrated system components 728. The data input/output (I/O) processor in various examples is able to be configured to support any type of data communications connections including present day analog and/or digital techniques or via a future communications mechanism. A system bus 718 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method to detect an open neutral condition, the method comprising:
receiving at a processor from a reporting electrical meter, via a communications network providing communications among a plurality of reporting electrical meters and the processor, respective voltage measurements of at least two phases of a three phase, wye-connected electrical power interface delivering power to a customer premises, the three phase, wye-connected electrical power interface comprising a neutral conductor that is separate from the at least two phases;
receiving, from the reporting electrical meter, an indication of an amount of electrical power drawn by the customer premises;
verifying sufficient electrical power consumption by the customer premises based on determining that the indication of the amount of electrical power drawn by the customer premises is above a threshold power consumption value;
receiving a first voltage measurement of a first phase of the at least two phases; receiving a second voltage measurement of a second phase of the at least two phases; determining, based on determining that a difference between the first voltage measurement and the second voltage measurement exceeds a phase-to-phase threshold amount,
and further based upon determining that the indication of the amount of electrical power drawn by the customer premises is above the threshold power consumption value,
the open neutral condition in the neutral conductor; and
sending an indication of the open neutral condition to a customer service system.

2. The method of claim 1, wherein determining that a difference between the first voltage measurement and the second voltage measurement exceeds the phase-to-phase threshold amount comprises:
determining the first voltage measurement exceeds a nominal voltage value by at least one half of the phase-to-phase threshold amount; and
determining the second voltage measurement is less than the nominal voltage value by at least one half of the phase-to-phase threshold amount,
where the nominal voltage value is a specified value of electrical voltage for the power delivered to the customer premises.

3. The method of claim 2, where the phase-to-phase threshold amount is at least twenty percent of the nominal voltage value.

4. The method of claim 2, further comprising determining the nominal voltage based upon respective average voltage measurements reported by at least one other reporting electrical meter within the plurality of reporting electrical meters that is other than the reporting electrical meter.

5. The method of claim 1:
wherein the verifying sufficient electrical power consumption by the customer premises is performed in response to determining that the difference between the first voltage measurement and the second voltage measurement exceeds the phase-to-phase threshold amount.

6. The method of claim 5, further comprising receiving a report of a customer complaint indicating an open circuit in the neutral conductor, and
wherein the verifying sufficient electrical power consumption by the customer premises is performed based on receiving the report of a customer complaint, and
where, based on the verification failing to verify sufficient electrical power consumption of the customer premises, the determining the open neutral condition is further based on receiving the report of the customer complaint.

7. The method of claim 1, further comprising:
accumulating, from the reporting electrical meter, a time sequence of the indication of the amount of electrical power drawn by the customer premises, a time sequence of first voltage readings, and a time sequence of second voltage readings; and
storing a time sequence of the indication of the amount of electrical power drawn by the customer premises, the time sequence of first voltage readings, and the time sequence of second voltage reading into a database, and
where the receiving the indication of the amount of electrical power drawn by the customer premises, receiving the first voltage measurement and receiving the second voltage measurement comprises retrieving the indication of the amount of electrical power drawn by the customer premises, the first voltage measurement, and the second voltage measurement from data stored in the database.

8. The method of claim 1, further comprising:
receiving, at a service truck dispatch system, the indication of the open neutral condition; and
dispatching, by the service truck dispatch system based on receiving the indication of the open neutral condition, a service truck to the customer premises.

9. The method of claim 1, further comprising receiving a report of a customer complaint indicating an open circuit in the neutral conductor, and
where the determining the open neutral condition is further based on receiving the report of the customer complaint.

10. The method of claim 1, further comprising:
receiving a time sequence of voltage measurements of the at least two phases, the time sequence covering at least a time duration, and
the time sequence of voltage measurements comprising a plurality of respective first voltage measurements for the first phase and a plurality of respective second voltage measurements for the second phase, and
the determining the open neutral condition being further based on determining that respective differences between each respective first voltage measurement in the time sequence of voltage measurements and each respective second voltage measurement in the time sequence of voltage measurements exceeds a phase-to-phase threshold amount for at least the time duration.

11. The method of claim 1, further comprising
increasing, based on determining the open neutral condition, a reporting rate for the reporting electrical meter to produce voltage measurements at an increased reporting rate;
receiving a third voltage measurement of a phase of the at least two phases, the third voltage measurement being made at the increased reporting rate;
receiving a fourth voltage measurement of another phase of the at least two phases, the fourth voltage measurement being made at the increased reporting rate; and
verifying, based on determining that a difference between the third voltage measurement and the fourth voltage measurement exceeds a second phase-to-phase threshold amount, the open neutral condition in the neutral conductor.

12. The method of claim 1, further comprising receiving a report of a customer complaint indicating an open circuit in the neutral conductor; and
increasing, based on receiving the customer complaint, a reporting rate for the reporting electrical meter to produce the voltage measurements.

13. The method of claim 1, where the threshold power consumption value is at least ten (10) percent of a rated load for the customer premises.

14. The method of claim 1 where the determining the open neutral condition is further based on determining, based on the indication of the amount of electrical power drawn by the customer premises, a change in electrical power drawn by the customer premises.

15. The method of claim 1, where the threshold power consumption value is at least one (1) percent of a rated load for the customer premises.

16. An open neutral detection processor, comprising:
a processor;
a memory communicatively coupled to the processor;
a communications network interface, communicatively coupled to the processor, the memory, and a communications network providing communications among a plurality of reporting electrical meters and the processor, each reporting electrical meter within the plurality of reporting electrical meters reporting, via the communications network, respective voltage measurements of at least two phases of a three phase, wye-connected electrical power interface delivering power to a respective customer premises, the three phase, wye-connected electrical power interface comprising a neutral conductor that is separate from the at least two phases the processor, when operating, being configured to:

receive, from each respective reporting electrical meter, a respective indication of an amount of electrical power drawn by the respective customer premises;

verify sufficient electrical power consumption by the respective customer premises based on determining that the respective indication of the amount of electrical power drawn by the respective customer premises is above a threshold power consumption value;

receive a first voltage measurement of a first phase of the at least two phases; receive a second voltage measurement of a second phase of the at least two phases; determine, based on determining that a difference between the first voltage measurement and the second voltage measurement exceeds a phase-to-phase threshold amount, and further based upon determining that the respective indication of the amount of electrical power drawn by the respective customer premises is above the threshold power consumption value, an open neutral condition in the neutral conductor; and send an indication of the open neutral condition to a customer service system.

17. The open neutral detection processor of claim 16, wherein the processor is configured to determine that the difference between the first voltage measurement and the second voltage measurement exceeds the phase-to-phase threshold amount by at least:

determining the first voltage measurement exceeds a nominal voltage value by at least one half of the phase-to-phase threshold amount; and determining the second voltage measurement is less than the nominal voltage value by at least one half of the phase-to-phase threshold amount, where the nominal voltage value is a specified value of electrical voltage for the power delivered to the respective customer premises.

18. The open neutral detection processor of claim 16, wherein the phase-to-phase threshold amount is at least twenty percent of a nominal voltage value.

19. The open neutral detection processor of claim 16, the processor being further configured to verify the sufficient electrical power consumption by the respective customer in response to a determination that the difference between the first voltage measurement and the second voltage measurement exceeds the phase-to-phase threshold amount.

20. The open neutral detection processor of claim 16, where the processor is configured to:

accumulate, from said each respective reporting electrical meter, a respective time sequence of the respective indication of the amount of electrical power drawn by the respective customer premises, a respective time sequence of first voltage readings, and a respective time sequence of second voltage readings; and store the respective time sequence of the respective indication of the amount of electrical power drawn by the respective customer premises, the respective time sequence of first voltage readings, and the respective time sequence of second voltage reading into a database, and the processing being further configured to receive the respective indication of the amount of electrical power drawn by the respective customer premises, receive the first voltage measurement and receive the second voltage measurement by at least retrieving the first voltage measurement and the second voltage measurement from nail data stored in the database of data reported by the reporting electrical meter.

21. The open neutral detection processor of claim 16, the processor being further configured to:

receive a time sequence of voltage measurements of the at least two phases, the time sequence covering at least a time duration, and the time sequence of voltage measurements comprising a plurality of respective first voltage measurements for the first phase and a plurality of respective second voltage measurements for the second phase, and where the processor is configured to determine the open neutral condition by determining that respective differences between each respective first voltage measurement in the time sequence of voltage measurements and each respective second voltage measurement in the time sequence of voltage measurements exceeds a phase-to-phase threshold amount for at least the time duration.

22. The open neutral detection processor of claim 21, the processor being further configured to:

increase, based on a determination of the open neutral condition, a reporting rate for said each reporting electrical meter to produce voltage measurements at an increased reporting rate;

receive a third voltage measurement of a phase of the at least two phases, the third voltage measurement being made at the increased reporting rate;

receive a fourth voltage measurement of another phase of the at least two phases, the fourth voltage measurement being made at the increased reporting rate; and verify, based on a determination that a difference between the third voltage measurement and the fourth voltage measurement exceeds a second phase-to-phase threshold amount, the open neutral condition in the neutral conductor.

23. The open neutral detection processor of claim 21, the processor being further configured to receive a report of a customer complaint indicating an open circuit in the neutral conductor, and where the processor is configured to increase, based on receiving the customer complaint, a reporting rate for said each reporting electrical meter to produce the time sequence of voltage measurements of the at least two phases.

\* \* \* \* \*